J. N. FOSTER.
DEMOUNTABLE RIM.
APPLICATION FILED NOV. 26, 1918.

1,306,957.

Patented June 17, 1919.
3 SHEETS—SHEET 1.

WITNESSES
W. W. Harris

INVENTOR
John N Foster
BY
ATTORNEYS

J. N. FOSTER.
DEMOUNTABLE RIM.
APPLICATION FILED NOV. 26, 1918.
1,306,957.
Patented June 17, 1919
3 SHEETS—SHEET 2.
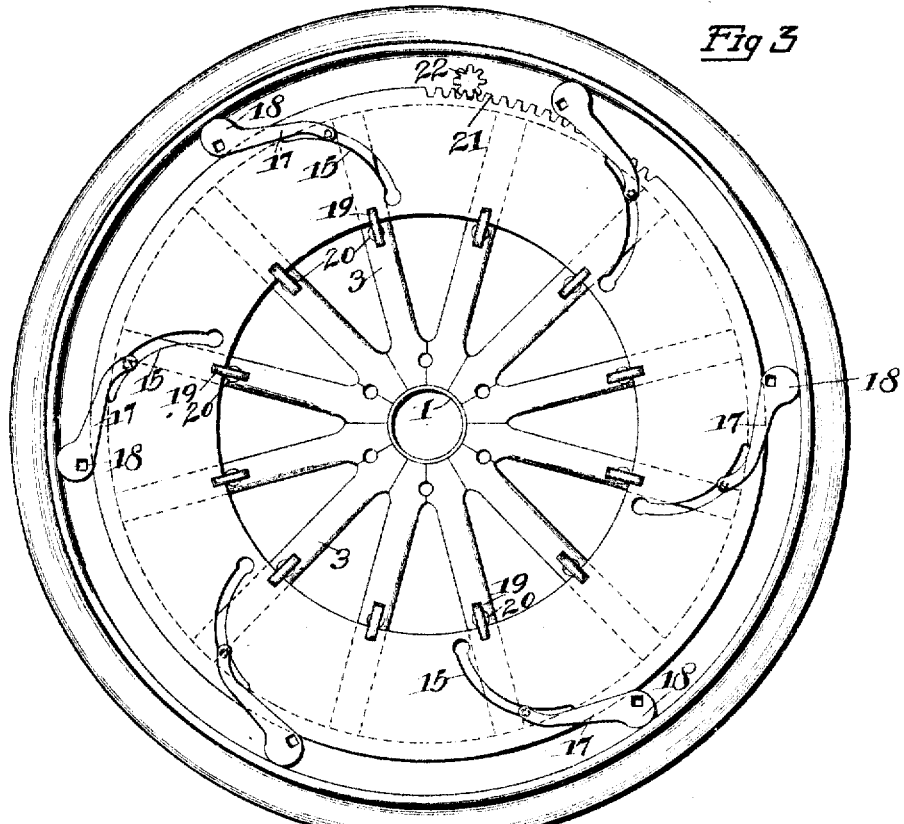
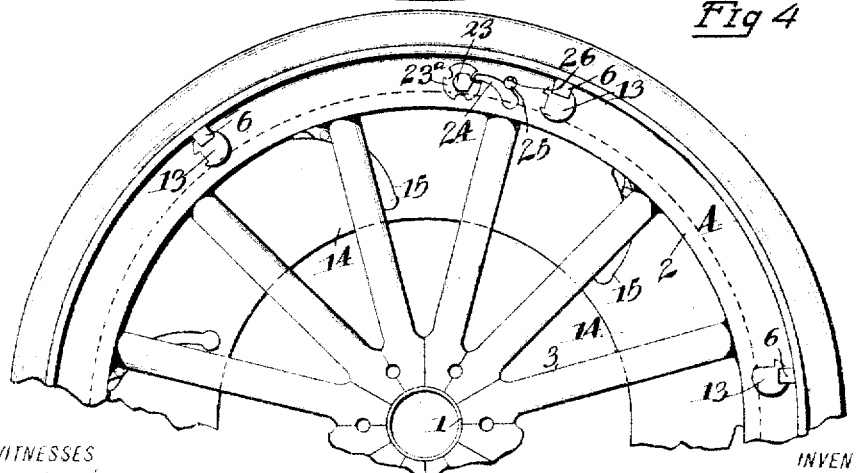

J. N. FOSTER.
DEMOUNTABLE RIM.
APPLICATION FILED NOV. 26, 1918.
1,306,957.
Patented June 17, 1919.
3 SHEETS—SHEET 3.
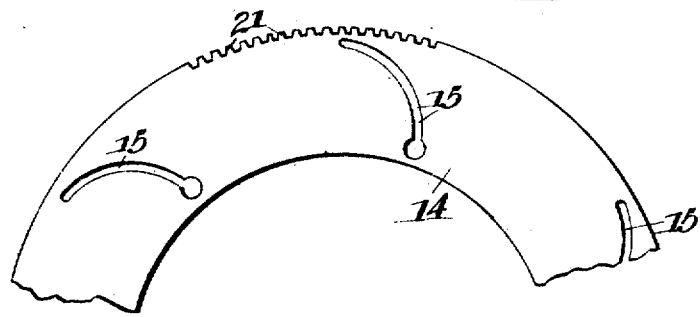
Fig 5
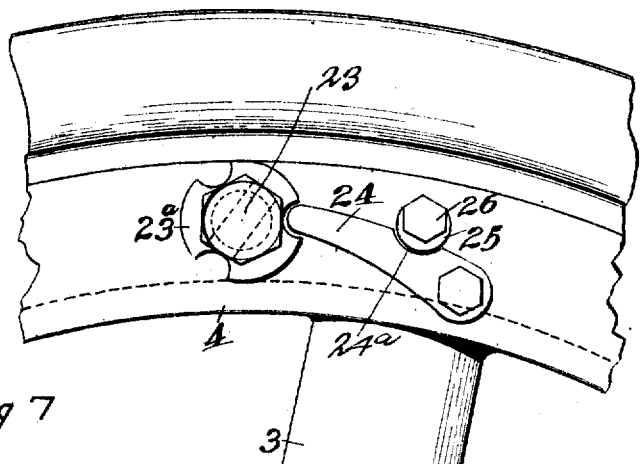
Fig 6
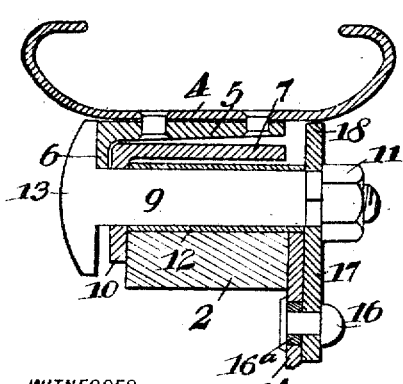
Fig 7
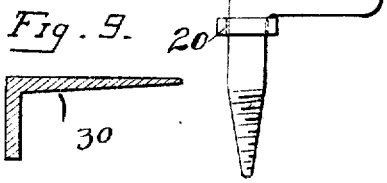
Fig. 9.
Fig 8
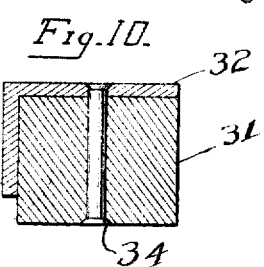
Fig. 10.
WITNESSES
W. W. Harris
INVENTOR
John N Foster
BY
ATTORNEYS

UNITED STATES PATENT OFFICE.

JOHN N. FOSTER, OF EL PASO, TEXAS, ASSIGNOR OF ONE-SIXTH TO HENRY BECKER AND ONE-SIXTH TO OTTO NORDWALD, BOTH OF EL PASO, TEXAS.

DEMOUNTABLE RIM.

1,306,957.	Specification of Letters Patent.	Patented June 17, 1919.

Application filed November 26, 1918. Serial No. 264,174.

*To all whom it may concern:*

Be it known that I, JOHN N. FOSTER, a citizen of the United States, and a resident of El Paso, in the county of El Paso and State of Texas, have invented certain new and useful Improvements in Demountable Rims, of which the following is a specification.

My invention is an improvement in demountable rims, and has for its object to provide a rim of the character specified, which may be locked to the rim or unlocked therefrom with a single operation.

In the drawings:

Fig. 3 is a view similar to Fig. 1, showing the parts in another position;

Fig. 4 is a view similar to Fig. 2, showing another position of the parts shown in said Fig. 2;

Fig. 5 is a partial side view of the cam ring;

Fig. 6 is a partial side view of the rim showing the locking mechanism for the pinion;

Fig. 7 is a section on the line 7—7 of Fig. 2;

Fig. 8 is a top plan view of the guide pin and roller;

Fig. 9 is a transverse section of a modified form of wedge;

Fig. 10 is a similar view showing a modified form of felly and felly band.

Figure 1:
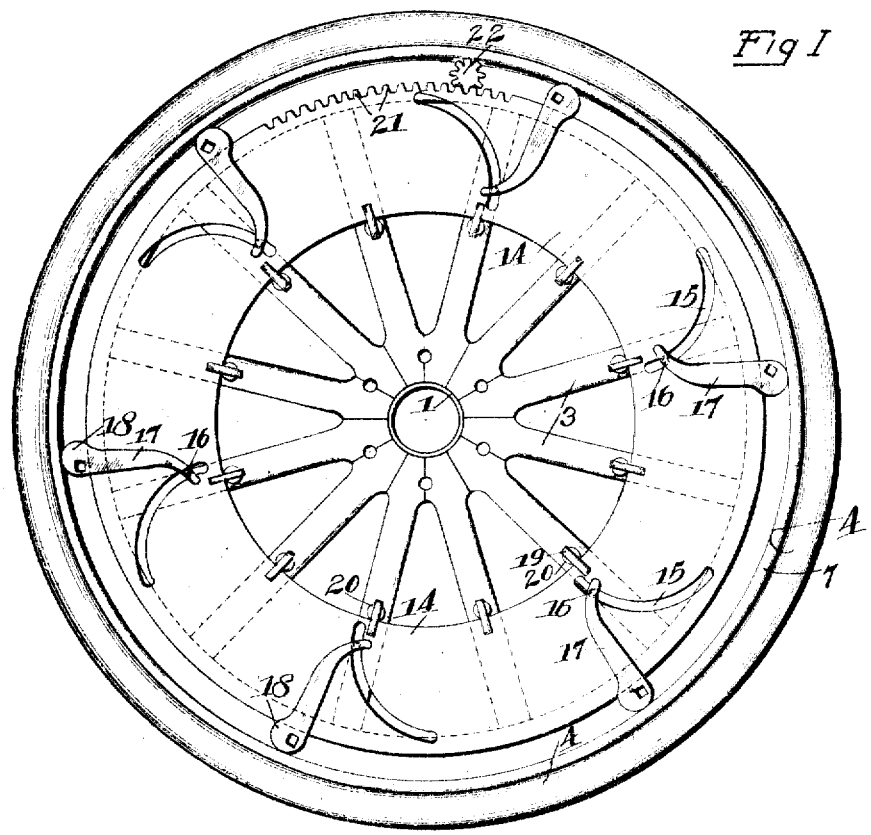
Figure 1 is a side view of the improved wheel, with one of the housing plates removed, showing the parts in one position.

In the present embodiment of the invention, the improved rim is shown in connection with a wheel consisting of the usual hub 1, felly 2 and spokes 3 connecting the hub and the felly. The rim or felly band 7 is arranged about the felly 2 and the auxiliary rim, indicated at 4, is arranged outside of the felly band. The said rim, which is of any usual or desired form, has secured to the inner face thereof a ring 5, by means of rivets, as shown, and this ring has a series of radial inwardly extending lugs 6 for a purpose to be presently described.

The ring 5 fits about the felly band 7, and the felly band is held to the felly 2 by means of bolts 9 which are passed through radial lugs 10 on the felly band and through openings in the felly, to be engaged by nuts 11 at the opposite side of the felly. A bushing 12 encircles each bolt within the opening of the felly. Each of these bolts 9 has a head 13, and the head of each bolt is partially cut away as shown, to permit the passage of the radial lug 6 of the ring 5, when the said cut away portion is turned into register with the lug.

At the opposite face of the wheel from the bolt heads 13 there is arranged a cam ring 14, the said ring having a series of cam slots 15 which extend substantially transversely thereto. Each of these cam slots is engaged by a roller 16ª journaled on a headed pin 16 connected to the inner end of a lever 17, whose outer end has a cam head 18 adapted to bear against the inner face of the rim 4 at the opposite side from the head 13 of the bolt 9 to support the said rim at this point.

The ring 14 is mounted to rotate coaxially with respect to the wheel, being supported by angle pins 19 which have threaded engagement with the respective spokes, one portion of each pin being threaded to engage the spoke and the other extending substantially parallel with the plane of the wheel and engaging outside of the ring 14.

A roller 20 is journaled on each pin on that portion which is perpendicular to the plane of the wheel, each roller 20 being engaged by the inner edge of the cam ring. Thus the cam ring is supported to rotate coaxially with the wheel and it has a series of rack teeth 21 on its peripheral edge, which are in engagement with the teeth of a pinion 22 secured to a shaft 23 journaled transversely of the felly of the wheel proper. This shaft carries at the end remote from the pinion a ratchet wheel 23ª, whose teeth are adapted to be engaged by a pawl 24 pivoted on the wheel.

This pawl has a notch 24ª in its upper edge which is adapted to be engaged by a cam or eccentric 25 on a pin 26 also journaled in the wheel. The pin 26 and the shaft 23 have polygonal heads, as shown, for engagement by wrenches to turn the same, and the head of the shaft 23 has a diametrical opening for engagement by a pin or lever to obtain sufficient leverage in turning the shaft.

In use, the rim 4 rests at one edge on the felly band, and at the other is supported by the cam-heads 18 of the levers 17. To demount the rim, the pawl 24 is released by turning the pin 26, and the shaft 23 may then be turned to turn the cam ring 14. This ring is turned in a direction to move the connected ends of the levers 17 inward. This movement of the lever brings the lower portions of the cam heads inward, and the rim may now be demounted after the heads 13 of the bolts 9 have been turned to permit the passage of the lugs 6. To mount the rim, this movement is reversed.

It will be noticed, referring to the drawing, that each of the bolts 9 has a polygonal portion upon which the adjacent lever 17 is arranged, the arrangement being such that when the bolt is turned the lever must swing and when the lever is swung the bolt must turn. When now the cam ring is moved angularly of the wheel, the levers are swung simultaneously to cause the heads 18 to release the rim 4 and at the same time the bolts are moved to bring the cut away portions of the heads into register with the lugs 6, so that the rim may be demounted. Thus the releasing of the internal pressure and of the lateral lock is simultaneous.

Figure 2:
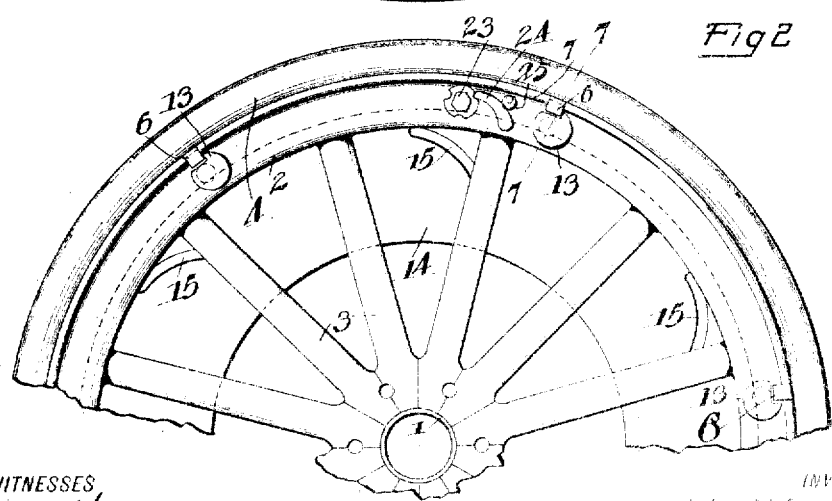
Fig. 2 is a partial side view of the complete wheel.

In Fig. 9 is shown a modified form of wedge 30, corresponding to the element 6 of Figs. 1 and 2. In Fig. 10 the felly 31 is riveted to the element 32, corresponding to the element 7—10 of Fig. 7, as indicated at 34.

I claim:

1. In a wheel, a demountable rim, said rim having at one edge of its inner face a ring adapted to seat upon the felly band of the wheel at one side of the band, means in connection with the wheel and movable outwardly with respect thereto for engaging the opposite edge of the rim to support the same, means for locking the rim from lateral movement away from said supporting means, and a common means for moving the first named means into operative and release positions and for controlling the locking means for the rim, said first named means comprising levers pivoted to the felly and having cam heads for engaging the demountable rim, the moving means for the levers comprising a cam ring mounted to rotate on the wheel.

2. In a wheel, a demountable rim, said rim having at one edge of its inner face a ring adapted to seat upon the felly band of the wheel at one side of the band, means in connection with the wheel and movable outwardly with respect thereto for engaging the opposite edge of the rim to support the same, means for locking the rim from lateral movement away from said supporting means and a common means for moving the first named means into operative and release positions and for controlling the locking means for the rim, said first named means comprising levers having cam heads pivoted on the felly band, the last named means consisting of lugs on the demountable rim and bolts forming the pivotal connections of the levers and having heads for engaging the ring of the demountable rim, said heads being cut away at the lugs to permit the passage of the same when turned into the proper position.

JOHN N. FOSTER.

Witnesses:
A. H. GOLDSTEIN,
NAN B. SMITH.